United States Patent [19]

Johnson

[11] Patent Number: 4,809,552

[45] Date of Patent: Mar. 7, 1989

[54] MULTIDIRECTIONAL FORCE-SENSING TRANSDUCER

[75] Inventor: Gary W. Johnson, Troy, Mich.

[73] Assignee: Allied-Signal, Inc., Morris County, N.J.

[21] Appl. No.: 123,886

[22] Filed: Nov. 23, 1987

[51] Int. Cl.$^4$ .............................................. G01P 5/08
[52] U.S. Cl. ..................................... 73/517 R; 338/5
[58] Field of Search ..................... 73/517 R, 514, 651, 73/862.65, 862.04; 338/2, 5, 46, 47

[56] References Cited

U.S. PATENT DOCUMENTS

| | | |
|---|---|---|
| 2,963,911 | 12/1960 | Courtney-Pratt et al. |
| 3,186,237 | 6/1965 | Forrest . |
| 3,233,466 | 2/1966 | Shaw, Jr. . |
| 3,378,648 | 4/1968 | Fenner .................................. 338/2 |
| 3,437,851 | 4/1969 | Cady . |
| 3,478,605 | 11/1969 | Siegel . |
| 3,501,732 | 3/1970 | Wilner .................................. 338/2 |
| 3,528,297 | 9/1970 | Lee . |
| 3,572,109 | 3/1971 | Yerman . |
| 3,848,144 | 11/1974 | Schissler . |
| 3,948,093 | 4/1976 | Folchi et al. ..................... 73/862.04 |
| 4,071,838 | 1/1978 | Block . |
| 4,244,225 | 1/1981 | Greenwood . |
| 4,327,359 | 4/1982 | Kurtz . |
| 4,346,597 | 8/1982 | Cullen . |
| 4,553,436 | 11/1985 | Hansson . |
| 4,616,511 | 10/1986 | Gindy et al. ..................... 73/862.04 |

FOREIGN PATENT DOCUMENTS 1534276 11/1978 United Kingdom ................... 338/5

OTHER PUBLICATIONS

K. W. Lee and B. E. Walker, "Silicon Micromachining Technology for Automotive Applications", SAE Pub. No. SP655, Feb. 1986, pp. 1–10.

*Primary Examiner*—John Chapman
*Attorney, Agent, or Firm*—Nixon & Vanderhye

[57] ABSTRACT

A multidirectional force-sensing transducer useful in automotive systems which require acceleration/deceleration detection. The transducer, in a preferred form, includes a unitary structure consisting essentially of silicon, and a substantially planar T-shaped force-sensing body integral with the unitary structure. The T-shaped force sensing body is comprised of base and cantilever beams defined in the unitary structure—the base and cantilever beams being strained principally in response to first and second forces acting upon the body in directions substantially within, and orthogonal to, the body's plane, respectively. Sensors (preferably thin film piezoresistors) operatively associated with the base and cantilever beams sense the strain of the base and/or cantilever beams and thus respectively detect the multidirectional forces acting upon the force-sensing body.

18 Claims, 1 Drawing Sheet

MULTIDIRECTIONAL FORCE-SENSING TRANSDUCER

FIELD OF THE INVENTION

This invention relates generally to the field of force-sensing transducers. More specifically, however, the field of this invention includes force-sensing transducers useful in automotive control systems requiring force detection in multiple directions. The invention is preferably embodied in a unitary structure having a planar T-shaped force-sensing body comprised of a base beam and a cantilever beam. Means are provided in operative association with the base and cantilever beams to sense the respective strain thereof and hence detect forces acting on the body in directions substantially within and orthogonal to, respectively, the plane of the base and cantilever beams (as will be discussed in greater detail below).

BACKGROUND AND SUMMARY OF THE INVENTION

Most of today's automobiles are equipped with closed-loop, electronic controls supported by on-board microcomputers so as to perform a variety of control functions. Thus, for example, electronic controls are provided to optimize fuel economy and engine operation, meet emission control requirements and to provide for more comfortable and/or safe driving characteristics for the automobile (e.g., such as those characteristics provided by antilocking and/or antiskid braking systems, positive traction systems, suspension adjustment systems and the like). These latter systems are dependant upon the ability of the electronic control loop to sense accurately forces acting upon the automobile system under control and then to exhibit the desired rate-responsiveness in order to exercise adequate control. As more sophisticated electronic control schemes have evolved, it is the sensors which have become performance limiting factors due principally to the inability of sensor fabrication technology to keep pace with the development of integrated automobile control systems.

Recently, however, "micromachining" techniques for forming structural three-dimensional devices from silicon have emerged as a cost-effective means of producing high quality (i.e., sufficiently sensitive) force sensors/transducers useful for the automotive industry. Thus, silicon micromachining techniques have been employed to form force transducers in the form of diaphragms, cantilever beams, microbridges and the like. (See, for example, Lee et al., "Silicon Micromachining Technology For Automotive Applications", SAE Publication No. SP655, February, 1986, the entire content of which is expressly incorporated hereinto by reference.)

It is necessary in many automotive applications (e.g., antiskid braking systems, traction control systems, and the like) for the sensor/transducer to be capable of not only sensing the magnitude of the force acting upon the automobile (i.e., so that the correct amount of control is exercised over the system), but also to be capable of sensing the direction of such forces Conventional force-sensing transducers (i.e., so-called accelerometers which detect acceleration/deceleration forces), and particularly those formed of silicon by micromachining techniques, are typically only capable of sensing forces in one direction. This inability of conventional force-sensing transducers thus necessitates the use of redundant sensors/transducers, each oriented in a particular operative direction in which forces are to be sensed. While such a redundant arrangement may be satisfactory to perform the intended function of providing the control system with force-sensing capabilities in multiple directions, it would obviously be more satisfactory if a single force-sensing transducer was available to sense forces in multiple directions. It is towards attaining such a unitary, multidirectional force-sensing transducer that the present invention is directed.

By way of the present invention, a force-sensing transducer useful in automotive control systems requiring force detection in multiple directions is provided and is preferably embodied in a unitary silicon structure having a planar T-shaped force-sensing body comprised of a base beam and a cantilever beam. Means, such as thin film piezoelectric resistor elements, are provided in operative association with the base and cantilever beams so as to sense respective strains thereof and hence detect forces acting on the body in directions substantially within, and orthogonally to, the plane of the force-sensing body, respectively.

The transducer of the present invention is conveniently fabricated by means of well-known silicon micromachining techniques and thus can be produced economically in fairly small sizes thereby lending themselves for use in a variety of applications, including closed-loop automobile control systems. These and other objects and advantages of this invention will become more clear to the reader after carefully reviewing the detailed description which follows.

BRIEF DESCRIPTION OF THE ACCOMPANYING DRAWINGS

Reference will hereinafter be made to the accompanying drawings in which like reference numerals throughout the various Figures denote like structural elements, and wherein.

DETAILED DESCRIPTION OF THE PREFERRED EXEMPLARY EMBODIMENT

Figure 1:
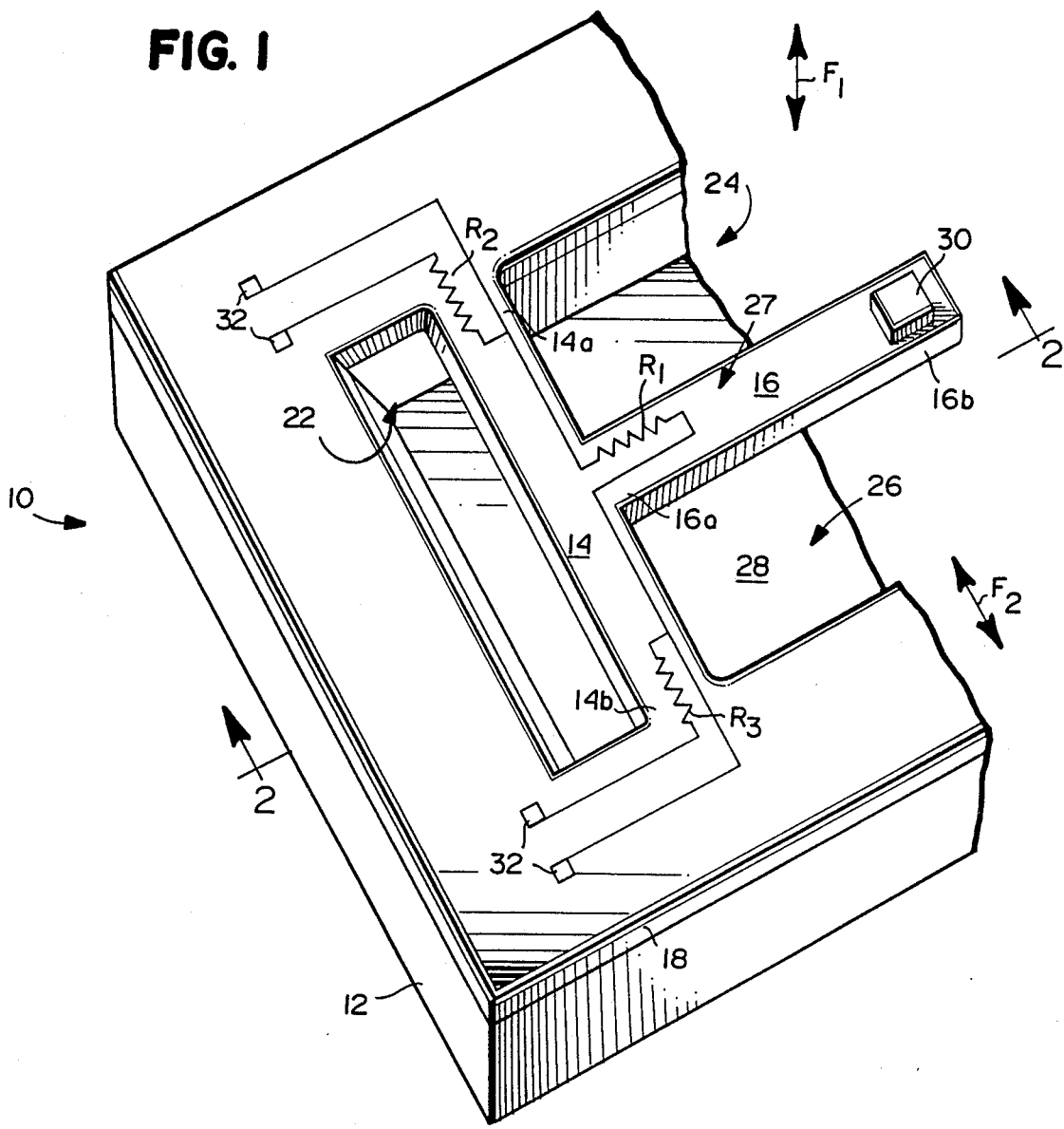
FIG. 1 is a schematic perspective view of a particularly preferred embodiment of the bidirectional force-sensing transducer according to the present invention.
Figure 2:
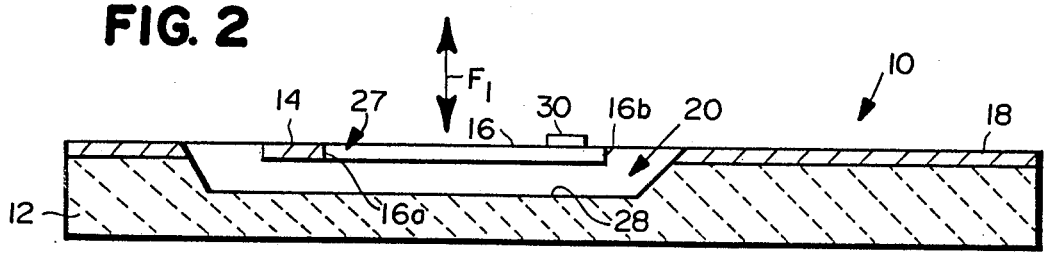
FIG. 2 is a schematic cross-sectional elevational view of the transducer shown in FIG. 1 taken along line 2—2 therein.

The multidirectional force-sensing transducer 10 of this invention is shown in accompanying FIGS. 1 and 2. The transducer 10 is conveniently formed from a unitary block 12 of silicon (i.e., a silicon chip or wafer of the type conventionally used in integrated circuit technology) utilizing silicon micromachining techniques. Briefly, silicon micromachining techniques involve photolithographic pattern transfer (i.e., so as to define, in this particular instance, base and cantilever beams 14, 16, respectively) followed by three-dimensional silicon etching (e.g., either isotropic or, more preferred due to its highly accurate etching directionality, anisotropic etching processes). Since these silicon micromachining techniques are notoriously well known, it is unnecessary here to describe them in greater detail. It is sufficient to note that when such micromachining techniques are employed, the transducer 10 usually will include an etch-stop doped layer 18 of silicon in which an etch-stop dopant (e.g., boron) has been diffused, and it is in association with this layer 18 in which the base and cantilever beams 14, 16, respectively, are formed. Thus, when employing silicon micromachining techniques, a trough 20 will be formed in the silicon block 12 via known silicon-etching techniques in such a manner that it "undercuts" both base beam 14 and cantilever beam 16 (see FIG. 2) formed in association with etch-stop doped layer 18 which is resistant to such etching.

The base and cantilever beams 14, 16, respectively, need not, however, be formed in association with an etch-stop doped layer 18 integral with the silicon block 12. Thus, the present invention may employ any suitable fabrication technique which defines the boundaries of base and cantilever beams 14, 16, respectively, while yet render them resistive to subsequent etching and undercutting of silicon block 12. And it is conceivable that etching or any other silicon removal technology could be utilized without forming an integral layer in the silicon block 12 in which the base and cantilever beams 14, 16, respectively, are formed. Suffice it to say that the transducer designer may select any fabrication expedient to form the base and cantilever beams 14, 16, respectively, in accordance with the principles of this invention.

The transducer 10 is fabricated (as mentioned above) so as to expose open areas 22, 24 and 26 in layer 18 which thereby establish the mutually orthogonal base and cantilever beams 14, 16, respectively—the beams 14 and 16 collectively forming a T-shaped force-sensing body 27 spaced above the floor 28 of trough 20. As is seen particularly in FIG. 1, the base beam 14 is integrally rigidly connected to the remainder of layer 18 (and hence to the silicon block 12) at each of its ends 14a and 14b. The cantilever beam 16, on the other hand, is integrally connected to the base beam 14 at its end 16a while its free end 16b is unconnected to any surrounding structure (thereby being "cantilever" in form). The cantilever beam 16, moreover extends orthogonally from, and lies within the same plane as, base beam 14.

The axial length of cantilever beam 16 is chosen so as to provide the desired resonancy (that is to say, to provide the desired deflection in response to applied forces). The resonancy of cantilever beam 16 can, in addition to the selection of beam length, be adjusted by affixing a weighted mass 30 (e.g., by means of depositing a desired thickness of metal) to free end 16b. The length of beam 16, the weight of mass 30, and the relative positioning of mass 30 along beam 16 may all be selected by the transducer designer so as to achieve desired specific performance characteristics.

Resistive elements $R_1$, $R_2$, and $R_3$ are operatively associated with the transducer 10. More particularly, resistive element $R_1$ is operatively associated with cantilever beam 16 while resistive elements $R_2$ and $R_3$ are operatively associated with base beam 14. Resistive elements $R_1$, $R_2$, and $R_3$ are each preferably a "tin film" type piezoresistor. That is, regions of layer 18 (i.e., corresponding in location to the resistive elements $R_1$, $R_2$, and $R_3$ shown in FIG. 1) may be diffused (i.e., doped) in accordance with well known techniques (see, for example, U.S. Pat. No. 4,071,838 entitled "Solid State Force Transducer and Method of Making Same" issued to Barry Block on Jan. 31, 1978, the entire content of this prior patent being expressly incorporated hereinto by reference) so as to provide such regions with any desired resistivity and thus provide for the sensitivity of transducer 10. The resistive elements are electrically connected to external circuitry (not shown) via metallized land regions 32.

As can be appreciated, a force acting orthogonally with respect to the collective plane of beams 18 and 20 (i.e., orthogonal to the planar T-shaped force-sensing body 27 in the direction of arrow $F_1$ in FIGS. 1 and 2) will cause cantilever beam 16 to be strained thereby altering the resistivity of element $R_1$ while the resistivity of elements $R_2$ and $R_3$ is substantially unaffected. Conversely, a force parallel to the plane of beams 14 and 16 (i.e., parallel to the plane of T-shaped force-sensing body 27 in the direction of arrow $F_2$ in FIG. 1) will cause a moment arm to be exerted upon base beam 14 by means of cantilever beam 16 and thus will compress/stretch a respective one of elements $R_2$ and $R_3$ in dependance upon the force direction while having negligible effect on element $R_1$. Any effect on element $R_1$ (when T-shaped body 27 experiences a force in the direction of arrow $F_2$) and elements $R_2$ and $R_3$ (when T-shaped body 27 experiences a force in the direction of arrow $F_1$) can, however, be electronically ignored by means of suitable circuity not shown.

Figure 3:
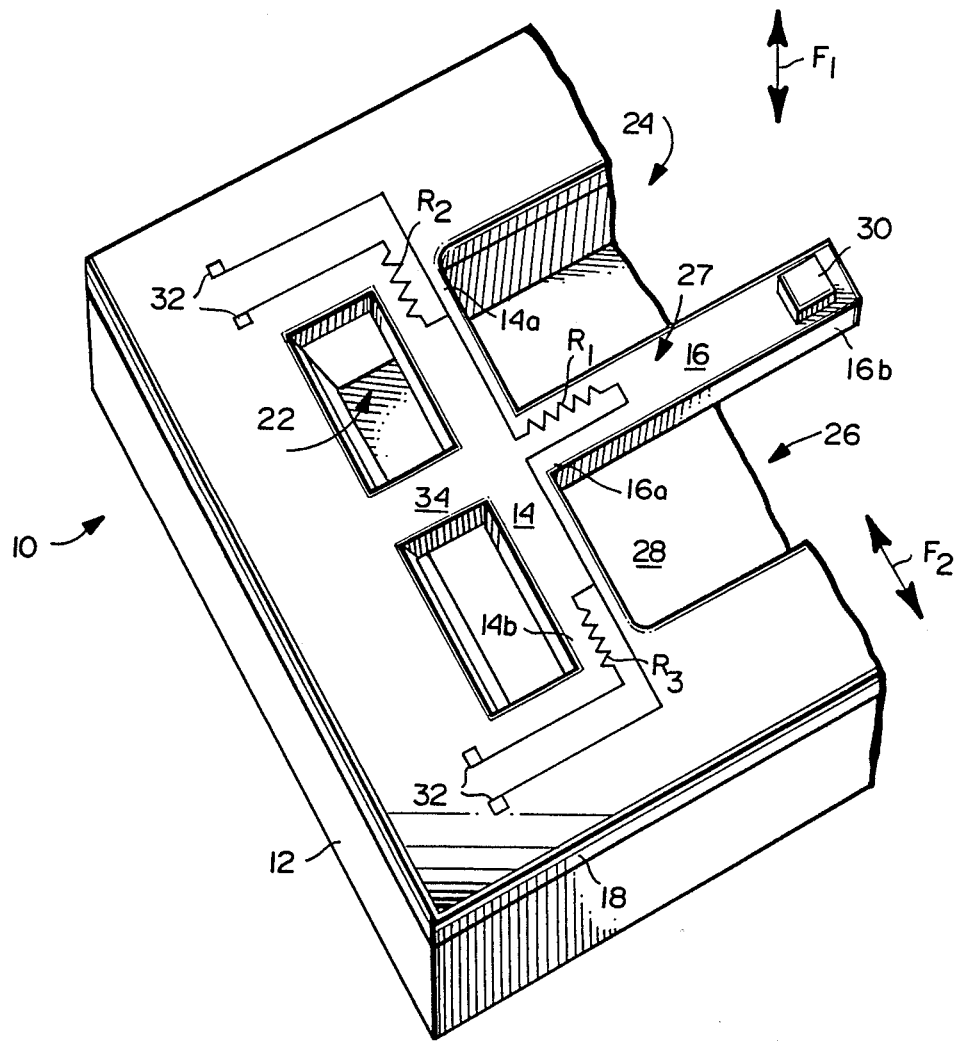
FIG. 3 is a perspective view of an alternative embodiment of the bidirectional force-sensing transducer.

A support beam 34 may optionally be provided opposite of cantilever beam 16 in such a manner that it spans the open area 22, as shown in FIG. 3. Preferably, support beam 34 is, like beams 14 and 16, integrally formed in layer 18 via micromachining techniques described previously. Support beam 34, if necessary, adds further structural support to the otherwise T-shaped force sensing body 27 comprised of base and cantilever beams 14, 16, respectively.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A transducer comprising a unitary structure which consists essentially of silicon, said structure defining (i) a trough having a floor which is recessed relative to a surface region of said structure, and (ii) open areas in said structure surface region so as to establish a T-shaped force-sensing body which provides a force-sensing plane spaced above said floor of said defined trough, and wherein said T-shaped force-sensing body includes:
   (1) a base beam integrally supported at each of its ends by said structure, and
   (2) a cantilever beam integrally supported at one of its ends by said base beam and having an opposite, unsupported end,
   said structure including means for sensing movements of said structure in directions substantially parallel and orthogonal to said force-sensing plane of said force-sensing body.

2. A transducer as in claim 1, wherein said surface region of said structure is an integral layer of doped silicon, and wherein said base and cantilever beams are each a part of said integral layer.

3. A transducer as in claim 1, wherein said cantilever beam includes a mass at the unsupported end.

4. A transducer as in claim 1, wherein said means for sensing includes (i) first force-sensing means operatively associated with said base beam for sensing forces substantially parallel to said plane of said force-sensing body, and (ii) second force-sensing means operatively associated with said cantilever beam for sensing forces substantially orthogonal to said plane of said force-sensing body.

5. A transducer as in claim 4, wherein at least one of said first and said second force-sensing means includes a piezoresistor.

6. A transducer as in claim 1, further comprising a support beam having one end integral with said structure and another end integral with said base beam, said support beam bridging one of said open areas oppositely of said cantilever beam.

7. A transducer comprising:
- a silicon block having an integral surface layer which consists essentially of doped silicon;
- a trough defined within said block and having a floor recessed relative to said surface layer; and
- a generally T-shaped force-sensing body formed in said surface layer and spaced above said floor of said defined trough, said T-shaped force-sensing body including;
  (i) a base beam supported at at least one of its ends,
  (ii) a cantilever beam supported at one of its ends by means of said base beam and having an opposite unsupported end,
  (iii) said base and cantilever beams collectively establishing a sensing plane, and
  (iv) first and second sensor means operatively associated with said base and cantilever beams for sensing acceleration or deceleration in directions substantially parallel and orthogonal to said sensing plane, respectively.

8. A transducer as in claim 7, wherein said cantilever beam includes a weighted mass at said unsupported end.

9. A transducer as in claim 7, wherein said base beam is integrally supported at each of its ends by means of said integral surface layer.

10. A transducer as in claim 7, wherein said first and/or second sensor means includes a piezoresistor.

11. A transducer as in claim 10, wherein said piezoresistor is formed integrally with said silicon block.

12. A transducer as in claim 9, wherein open areas in said integral surface layer define said base and cantilever beans, and wherein said transducer further comprises a support beam also integral with said surface layer and bridging one of said open areas oppositely of said cantilever beam.

13. A multidirectional force-sensing transducer comprising:
- a unitary structure consisting essentially of silicon and defining a trough having a recessed floor region within said unitary structure, and
- a substantially planar force-sensing body integral with said unitary structure and spaced above said floor region of said defined trough, said force-sensing body establishing a force-sensing plane and including:
  (i) a base beam defined in said structure which is strained principally in response to a first force acting upon said body in a direction substantially within the force-sensing plane thereof;
  (ii) a cantilever beam integrally connected at one of its ends to said base beam and having an opposite unsupported end, said cantilever beam being strained principally in response to a second force acting upon said body in a direction substantially orthogonal to the force-sensing plane thereof; and
  (iii) means operatively associated with said base and cantilever beams for sensing strain of said base and cantilever beams in response to said first and second forces acting upon said body in said directions substantially within, and substantially orthogonal to, said force-sensing plane, respectively.

14. A transducer as in claim 13, wherein said cantilever beam includes a mass at said unsupported end thereof.

15. A transducer as in claim 13 wherein said force-sensing body further includes a support beam rigidly connected to said base beam and located oppositely of said cantilever beam.

16. A transducer as in claim 15, wherein said means defining said base beam includes etched openings in said silicon structure, and wherein said support beam bridges one of said openings and extends in an opposite direction of said cantilever beam.

17. A transducer comprising:
- a unitary silicon block including a surface region, and a trough having a floor region which is recessed within said silicon block relative to said surface region thereof;
- force-sensing means integral with said silicon block surface region and spaced above said recessed floor of said trough so as to establish a force-sensing plane, said force-sensing means sensing forces acting thereupon in directions substantially within, and substantially perpendicular to, said established force-sensing plane thereof; and
- means operatively associated with said force-sensing means for sensing strain thereof in response to forces acting thereupon in at least one of said directions, wherein
- said force-sensing means includes,
  (a) a base beam integrally supported at at least one of its ends by means of said silicon block, said base beam extending between said ends thereof in a first direction;
  (b) a cantilever beam integrally supported at one of its ends by means of said base beam, and having an opposite, unsupported end, said cantilever beam extending between its said supported and unsupported ends in a second direction substantially perpendicular to said first direction;
  (c) said base and cantilever beams collectively establishing said force-sensing plane; and
  (d) a support beam also extending in said second direction oppositely of said cantilever beam, and being integrally supported at one of its ends by means of said base beam, and at another of its ends by means of said silicon block.

18. A transducer as in claim 17, wherein said silicon block surface region consists essentially of doped silicon, and wherein said base, cantilever, and support beams are each an integral part of said doped silicon surface region.

* * * * *